(12) United States Patent
Lin et al.

(10) Patent No.: US 10,982,790 B2
(45) Date of Patent: Apr. 20, 2021

(54) WATERWAY SWITCH SWITCHING VALVE AND ITS SWITCHING METHOD AND A WATERWAY SWITCH VALVE FOR A BATHTUB

(71) Applicant: XIAMEN SOLEX HIGH-TECH INDUSTRIES CO., LTD., Fujian (CN)

(72) Inventors: Fangqi Lin, Fujian (CN); Lihong Hu, Fujian (CN)

(73) Assignee: XIAMEN SOLEX HIGH-TECH INDUSTRIES CO., LTD., Fujian (CN)

( * ) Notice: Subject to any disclaimer, the term of this patent is extended or adjusted under 35 U.S.C. 154(b) by 35 days.

(21) Appl. No.: 16/291,972

(22) Filed: Mar. 4, 2019

(65) Prior Publication Data
US 2020/0072380 A1    Mar. 5, 2020

(30) Foreign Application Priority Data

Aug. 28, 2018   (CN) .......................... 201810986914.8

(51) Int. Cl.
*F16K 31/524*    (2006.01)
*F16K 11/07*    (2006.01)

(52) U.S. Cl.
CPC ........ *F16K 31/52483* (2013.01); *F16K 11/07* (2013.01); *Y10T 137/86493* (2015.04)

(58) Field of Classification Search
CPC .............. F16K 31/52483; F16K 11/07; Y10T 137/86493
See application file for complete search history.

(56) References Cited

U.S. PATENT DOCUMENTS

| | | | |
|---|---|---|---|
| 9,909,684 B2 * | 3/2018 | Zhou | F16K 11/07 |
| 2019/0194916 A1 * | 6/2019 | Tzeng | E03O 1/041 |
| 2019/0301621 A1 * | 10/2019 | Guindi | F16K 11/085 |

FOREIGN PATENT DOCUMENTS

| | | | | |
|---|---|---|---|---|
| JP | 02075833 A | * | 3/1990 | |
| JP | 2009000231 A | * | 1/2009 | |
| JP | 2016089613 A | * | 5/2016 | F16K 19/006 |

* cited by examiner

*Primary Examiner* — Kevin R Barss
(74) *Attorney, Agent, or Firm* — Cooper Legal Group, LLC (57) ABSTRACT

The invention provides a waterway switch switching valve, which comprises: valve body, main control valve core and waterway control valve core; the valve body comprises a water inlet channel, a first water outlet and a second water outlet, the number of waterway control valve core corresponds to the number of water outlets one by one, and is divided into the first and second waterway control valve core; the first waterway control valve core and the second waterway control valve core are respectively installed in the valve body; The valve body also comprises a first waterway arranged between the water inlet channel and the first waterway control valve core; and a second waterway between the first waterway control valve core and the second waterway control valve core; when the first waterway control valve core is opened, the first waterway control valve core connects the first waterway with the first water outlet; when the first waterway control valve core is closed, the first waterway control valve core connects the first waterway with the second waterway; when the second waterway control valve core is opened, the second waterway communicates with the second water outlet. The above waterway switch switching valve ensures that there is only one waterway discharge water at most.

12 Claims, 9 Drawing Sheets

WATERWAY SWITCH SWITCHING VALVE AND ITS SWITCHING METHOD AND A WATERWAY SWITCH VALVE FOR A BATHTUB

FIELD OF THE DISCLOSURE

The invention relates to a waterway switching structure, in particular to a waterway switching valve.

BACKGROUND OF THE DISCLOSURE

Traditional bathtub effluent system often includes a bathtub effluent faucet and a shower water shower on the head, as well as operation parts to control the effluent.

The traditional operation parts are separated, that is to say, the bathtub effluent faucet and the head shower water shower are controlled by an independent switch respectively. The disadvantage of this structure is that the switch position is not uniform and the control is rather cumbersome. And if the two switches are opened together, there will be counter-current phenomenon, which makes the bathtub effluent faucet and head shower sprinkle discharge water at the same time, resulting in misoperation.

BRIEF SUMMARY OF THE DISCLOSURE

The main technical problem to be solved by the invention is to provide a waterway switching structure, when both waterways are opened, only one waterway discharge water and it can avoid countercurrent.

In order to solve the technical problems mentioned above, the invention provides a waterway switching valve, wherein: a valve body, a main control valve core and waterway control valve core; the valve body comprises a water inlet channel, a first water outlet and a second water outlet, the number of waterway control valve cores corresponds to the number of water outlets one by one, and define the first and second waterway control valve cores; the first waterway control valve core and the second waterway control valve core are respectively installed in the valve body.

The valve body also comprises a first waterway arranged between the water inlet channel and the first waterway control valve core; and a second waterway between the first waterway control valve core and the second waterway control valve core; when the first waterway control valve core is opened, the first waterway control valve core connects the first waterway with the first water outlet; when the first waterway control valve core is closed, the first waterway control valve core connects the first waterway with the second waterway; when the second waterway control valve core is opened, the second waterway communicates with the second water outlet.

In a preferred embodiment: the water inlet channel comprises a cold water inlet, a hot water inlet and a mixed water outlet; the main control valve core is used for opening or closing the mixed water outlet.

In a preferred embodiment: the first waterway control valve core has a first water inlet end, a first water outlet end and a second water outlet end which are always connected with the first water way; when the first waterway control valve core is opened, the first water outlet end communicates with the first water outlet; when the first water control valve core is closed, the second water outlet end is communicated with the second waterway.

In a preferred embodiment: the second waterway control valve core has second water inlet end and third water outlet end; the second water inlet end is communicated with the second waterway, and the third water outlet end is communicated with the second water outlet; when the second waterway control valve core is opened, the second water inlet end is communicated with the third water outlet end; when the second waterway control valve core is closed, the second water inlet end and the third water outlet end are partitioned off.

In a preferred embodiment: the first waterway control valve core and the second waterway control valve core are pressing control valve cores.

In a preferred embodiment: the first waterway control valve core comprises a shell; the side wall of the shell is provided with the first water outlet end and the second water outlet end along the axis, the first water inlet end is located between the first water outlet end and the second water outlet end.

A pressing switch rod and a first seal and a second seal disposed axially within the shell are also included, the first seal is located between the first water inlet end and the first water outlet end, and the second seal is located between the first water inlet end and the second water outlet end; a blocking element is arranged outside the pressing switch rod along the axial direction; when the first waterway control valve core is opened, the pressing switch rod moves downward along the axial direction, so that the blocking element is separated from the first seal, and is sealed against the second seal. When the valve core of the first waterway control valve is closed, the pressing switch rod moves upward along the axial direction, so that the blocking element is separated from the second seal, and is sealed against the first seal.

In a preferred embodiment: the second waterway control valve core comprises a shell; the side wall of the shell is provided with the second water inlet end, and the bottom end portion is provided with the third water outlet end; a pressing switch rod and a seal which moves along the axial direction with the pressing switch rod are also included; when the second waterway control valve core is opened, the pressing switch rod moves upward along the axis, so that the seal is separated from the peripheral wall of the third water outlet end, and the second water outlet end and the second water inlet end are connected; when the second waterway control valve core is closed, the pressing switch rod moves downward along the axis, so that the seal is sealed to the peripheral wall of the third water outlet end, and separates the second water outlet end is separated from the second water inlet end.

In a preferred embodiment: the first waterway control valve core comprises a shell; the side wall of the shell is provided with the first water outlet end and the second water outlet end along the axis, the first water inlet end is located between the first water outlet end and the second water outlet end.

A pressing switch rod and a first seal and a second seal disposed axially within the shell are also included, the first seal is located between the first water inlet end and the first water outlet end, and the second seal is located between the first water inlet end and the second water outlet end; the pressing switch rod is provided with a first blocking element and a second blocking element connected along the axis, and the first blocking element and the second blocking element are arranged up and down along the axis.

When the first waterway control valve core is opened, the pressing switch rod moves downward along the axis, so that the first blocking element is separated from the first seal, and the second blocking element is sealed against the second seal. When the first waterway control valve core is closed, the pressing switch rod moves upward along the axis, so that the second blocking element is separated from the second seal, and the first blocking element is sealed against the first seal.

In a preferred embodiment: the second waterway control valve core comprises a shell; the side wall of the shell is provided with the second water inlet end and the third water outlet end; the second water inlet end is communicated with the second waterway.

A pressing switch rod and a seal arranged along the axial direction in the shell are also included; the seal is positioned between the second water inlet end and the third water outlet end; the pressing switch rod is provided with a blocking element which is connected along the axial direction. When the second waterway control valve core is opened, the pressing switch rod moves upward along the axis, so that the blocking element is separated from the seal, and the third water outlet end are connected to the second water inlet end; when the second waterway control valve core is closed, the pressing switch rod moves downward along the axial direction, so that the blocking element is fitted with the seal, and the third water outlet end are separated from the second water inlet end.

The invention also provides a waterway switching valve for a bathtub, the bathtub comprises the waterway switching valve. The first water outlet is connected to the bathtub faucet, and the second water outlet is connected to a shower head.

In a preferred embodiment: the waterway switching valve also comprises an operation panel, and the operation handle of the main control valve core and the operation part of the waterway control valve core are disposed in the operation panel.

The invention also provides a switching method for the waterway switching valve, which comprises the following steps:

1) the main control valve core is opened;
2) the first waterway control valve core is opened, when the first water outlet discharge water; at this time, no matter whether the second waterway control valve core is opened or closed, the second water outlet does not discharge water; and
3) the first waterway control valve core is closed, the second waterway control valve core is opened, and the second water outlet discharge water.

Compared with the existing technology, the technical proposal of the invention has the following beneficial effects:

1. The invention provides a waterway switching valve for a bathtub. When the bathtub faucet discharges water, the shower head will not discharge water in any case, thus solving the problem that two showers simultaneously discharge water in the traditional bathtub water outlet system.

2. The invention provides a waterway switching valve for a bathtub. The operation panel is arranged on the wall, and is separated from the and the bathtub faucet. So the three switches are concentrated together, the operation is relatively simple, and there is no need to install another switch on the shower head and bathtub faucet, the appearance is more concise, and the integrity is better.

DETAILED DESCRIPTION OF THE EMBODIMENTS

In order to further explain the technical scheme of the patent of the invention, the following detailed description is made through specific embodiments.

Embodiment 1

Referring to FIG. 1-6, the embodiment provides a waterway switching valve for a bathtub, comprising: a waterway switching valve 1 and an operation panel 2; the waterway switching valve 1 further comprises: a valve body 11, a main control valve core 12 and a waterway control valve core 13; the valve body 11 comprises an water inlet channel, a first water outlet 111 and a second water outlet 112. The number of the waterway control valve core 13 corresponds to the water outlet one by one, and is divided into the first waterway control valve core 131 and the second waterway control valve core 132. The first waterway control valve core 131 and the second waterway control valve core 132 are respectively installed in the valve body 11. The valve body 11 also includes a first waterway 113 arranged between the water inlet channel and the first waterway control valve core 131; and second waterway 114 arranged between the first waterway control valve core 131 and the second waterway control valve core 132.

Figure 4:
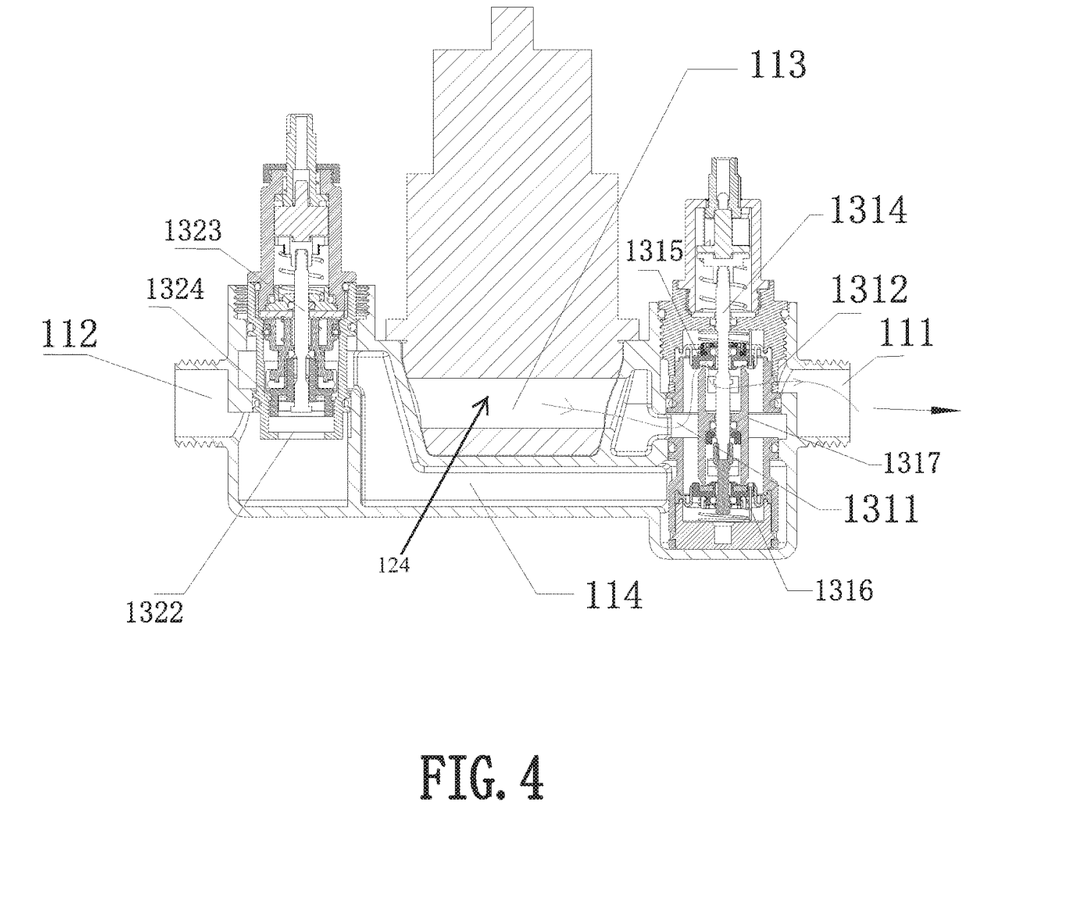
FIG. 4 is a waterway map when the first water outlet discharge water in the preferred embodiment 1 of the invention.

When the first waterway control valve core 131 is opened, the first waterway control valve core 131 connects the first waterway 113 and the first water outlet 111. When the first waterway control valve core 131 is closed, the first waterway control valve core 131 connects the first waterway 113 and the second waterway 114.

Figure 5:
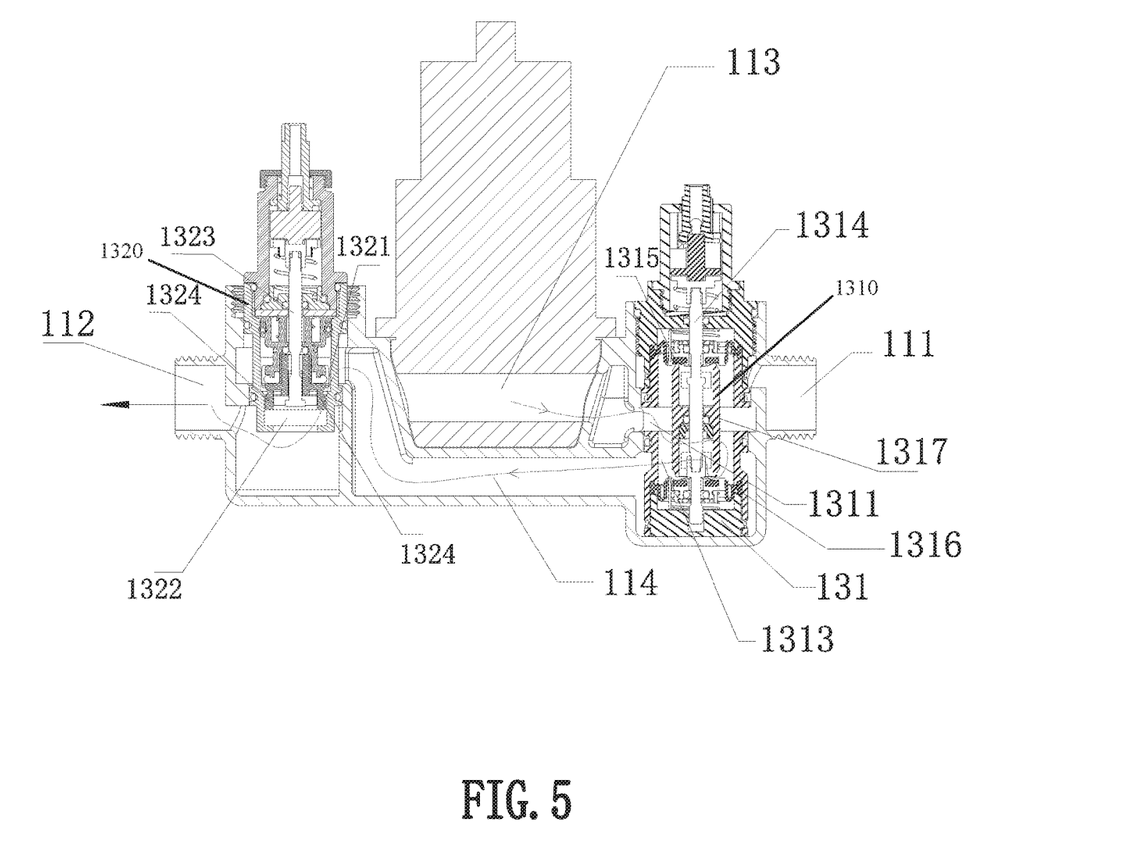
FIG. 5 is a waterway map when the second water outlet discharge water in the preferred embodiment 1 of the invention.

When the second waterway control valve core 132 is opened, the second waterway 114 and the second water outlet 112 are connected.

In the present embodiment, the first water outlet 111 is connected with the bathtub outlet faucet, and the second water outlet 112 is connected with the head outlet water shower because it is a waterway switching valve of the bathtub. If the waterway switching valve 1 is used in other water outlet devices, the first water outlet 111 and the second water outlet 112 are connected with the corresponding water outlet devices, which is a simple replacement of the present embodiment and will not be repeated.

Figure 1:
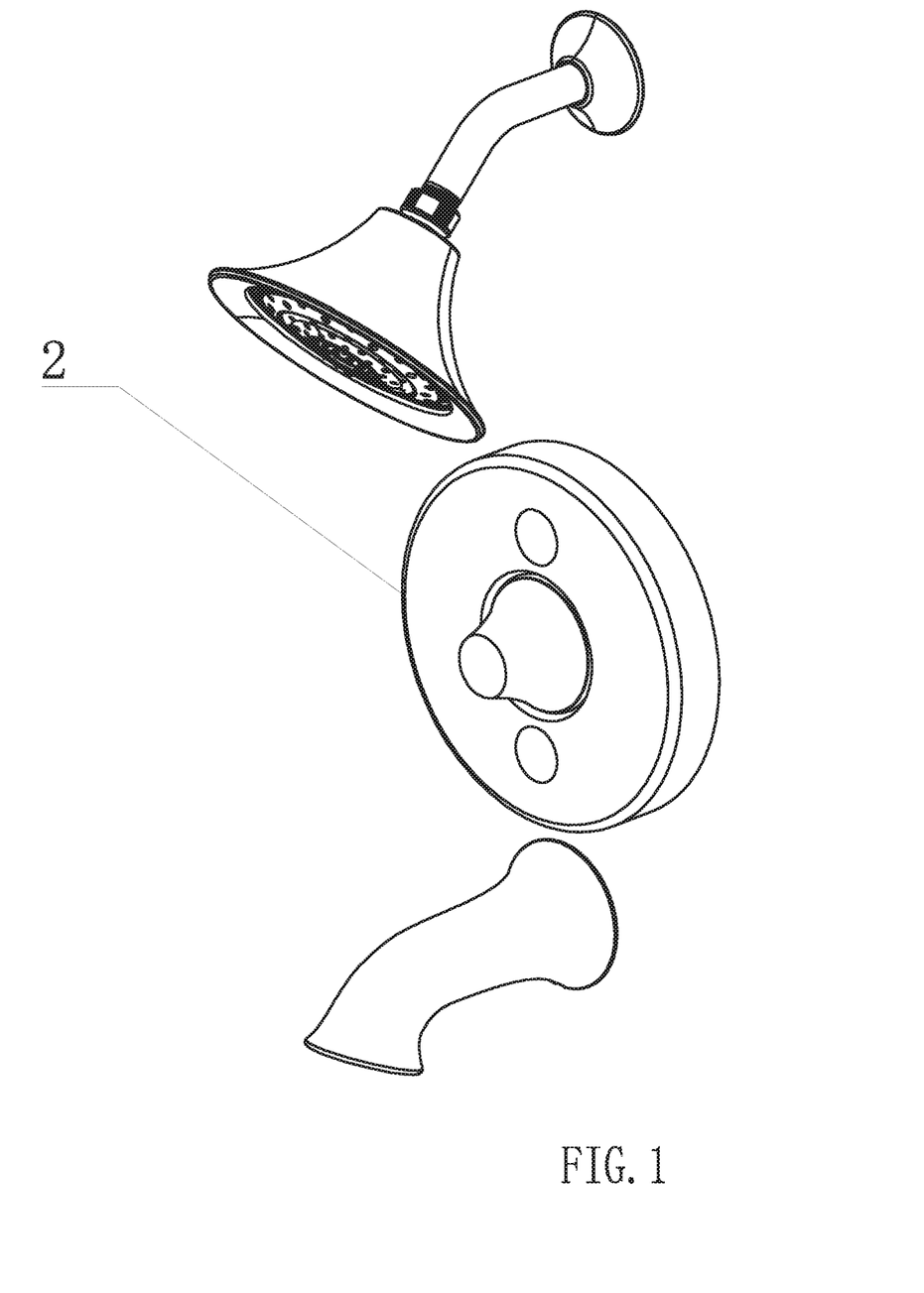
FIG. 1 is an appearance schematic diagram of the waterway switch valve of the bathtub in the preferred embodiment 1 of the present invention.
Figure 2:
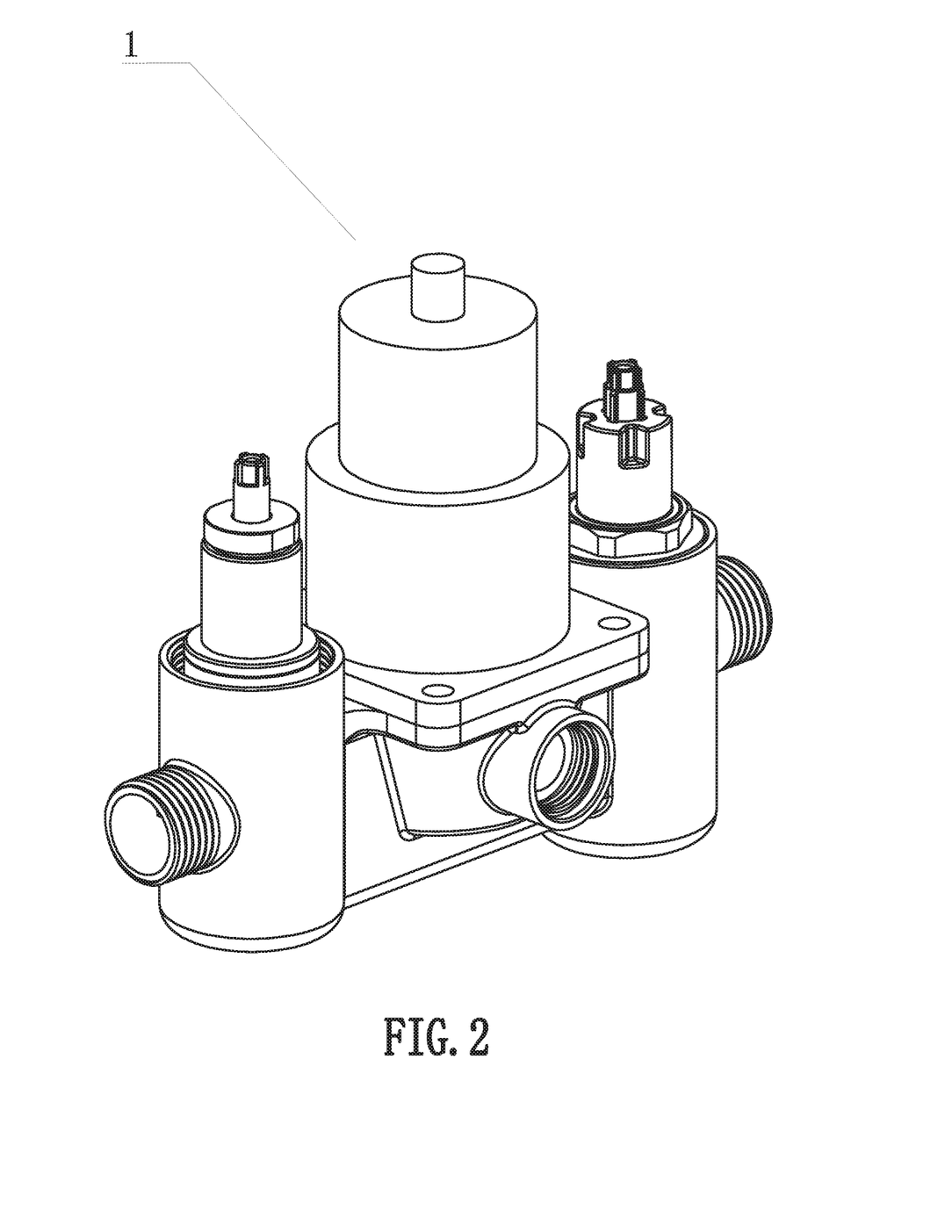
FIG. 2 is an appearance schematic diagram of the waterway switching valve in the preferred embodiment 1 of the invention.

The operation panel 2 is provided with the operation handle of the main control valve core 12 and the operation part of the waterway control valve core. The operation panel 2 is arranged on the wall, and is separated from the shower head and the bathtub faucet. So the three switches are concentrated together, the operation is relatively simple, and there is no need to install another switch on the shower head and bathtub faucet, the appearance is more concise, and the integrity is better.

The switching method of the waterway switching valve of the bathtub comprises the following steps:

1) the main control valve core 12 is opened;
2) the first waterway control valve core 131 is opened, at this time the first water outlet 111 discharge water, so that no water exists in the second waterway 114; at this time, no matter whether the second waterway control valve core 132 is opened or closed, the second water outlet 112 does not discharge water.
3) the first waterway control valve core 131 is closed, the second waterway control valve core 132 is opened, and the second water outlet 112 discharge water.

Through the above description, it can be known that the waterway switching valve of the bathtub provided by the present embodiment will not discharge water in any case when the faucet of the bathtub discharge the water, thus solving the problem that the two water showers simultaneously discharge water in the traditional bathtub outlet system.

Specifically, since which is recorded in the present embodiment is a waterway switching valve of the bathtub, the water inlet channel includes a cold water inlet, a hot water inlet and a mixed water outlet. The main control valve core 12 is used for opening or closing the mixed water outlet. If it is a water outlet device with only cold water outlet, only one cold water inlet and outlet can be set up. A simple replacement that also belongs to this embodiment is no longer repeated.

In the present embodiment, the first waterway control valve core 131 and the second waterway control valve core 132 are pressing control valve core.

The first waterway control valve core 131 has a first water inlet end 1311, a first water outlet end 1312 and a second water outlet end 1313 which are always connected with the first waterway 113. When the first waterway control valve core 131 is opened, the first water outlet end 1312 is connected with the first water outlet 111. When the first waterway control valve core 131 is closed, the second water outlet end 1313 is connected with the second waterway 114.

Figure 3:
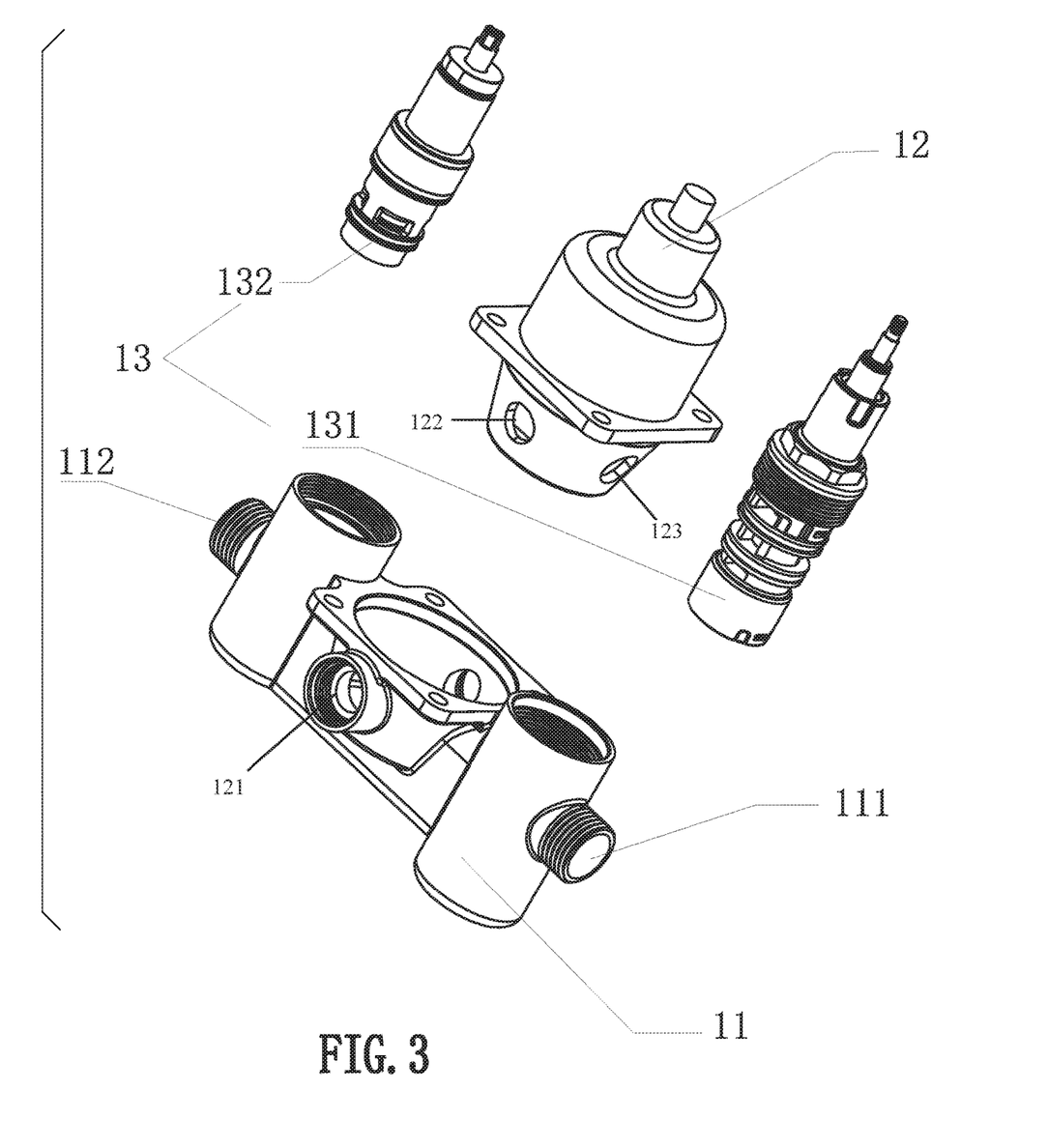
FIG. 3 is a structural explosion diagram of a waterway switching valve in the preferred embodiment 1 of the invention.

To achieve the above structure, the first waterway control valve core 131 includes a shell. The side wall of the shell is provided with the first water outlet end 1312 and the second water outlet end 1313 along the axis, and the first water inlet end 1311 is located between the first water outlet end 1312 and the second water outlet end 1313. The first waterway control valve core 131 also includes a pressing switch rod 1314, a first seal 1315 and a second seal 1316 arranged in the shell along the axis, the first seal 1315 is between the first water inlet end 1311 and the first water outlet end 1312, and the second seal 1316 is between the first water inlet end 1311 and the second water outlet end 1313. The outer of the pressing switch rod 1314 is provided with a blocking element 1317 which moves along the axial direction.

Figure 6:
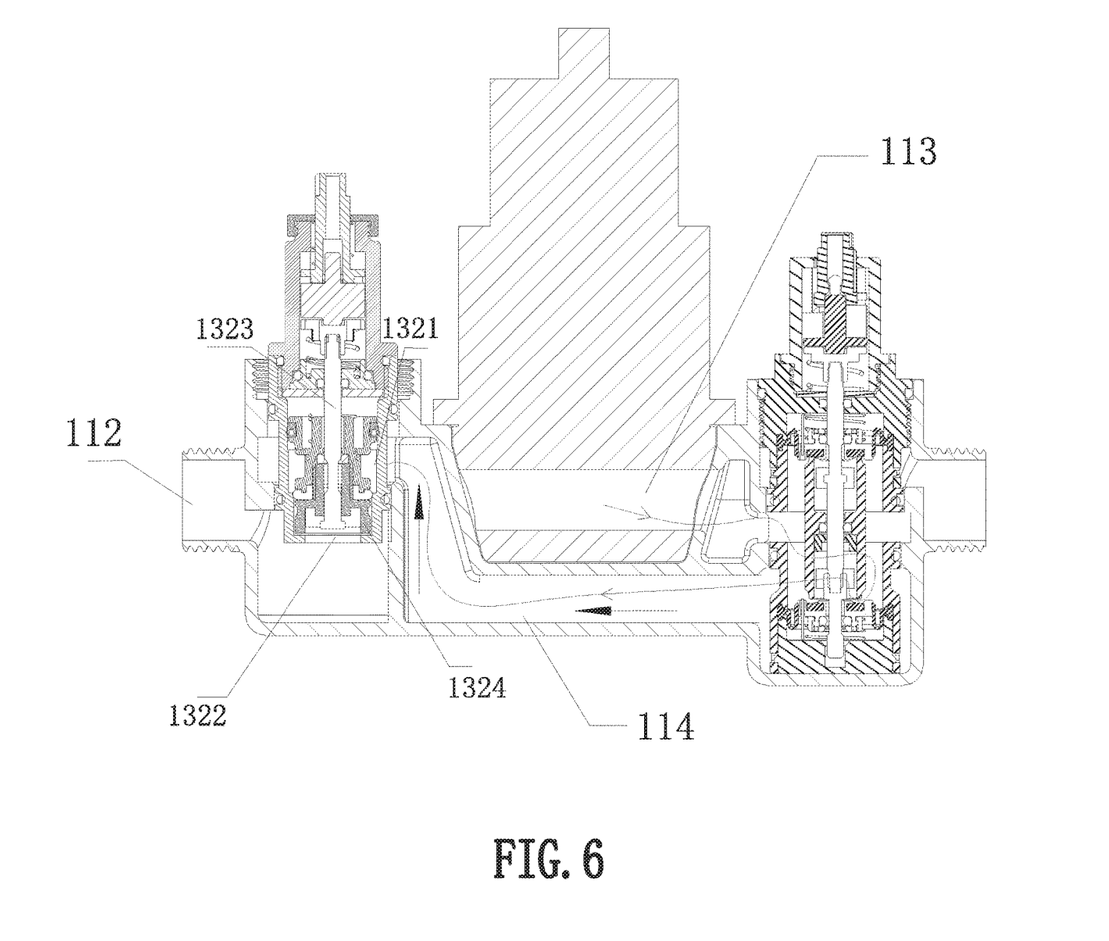
FIG. 6 is a waterway map showing that the first water outlet and the second water outlet do not discharge water in the preferred embodiment 1 of the invention.

When the first waterway control valve core 131 is opened, the pressing switch rod 1314 moves downward along the axis, so that the blocking element 1317 is separated from the first seal 1315, and is sealed against the second seal 1316. When the first waterway control valve core 131 is closed, the pressing switch rod 1314 moves upward along the axis, the blocking element 1317 is separated from the second seal 1316 and is sealed against the first seal 1315.

The second waterway control valve core 132 has second water inlet end 1321 and third water outlet end 1322. The second water inlet end 1321 is connected with the second waterway 114, and the third water outlet end 1322 is connected with second water outlet 112.

When the second waterway control valve core 132 is opened, the second water inlet end 1321 is connected with the third water outlet end 1322. When the second waterway control valve core 132 is closed, the second water inlet end 1321 and the third water outlet end 1322 are separated.

In order to realize the above structure, the second waterway control valve core 132 comprises a shell. The side wall of the shell is provided with the second water inlet end 1321, and the bottom end portion is provided with the third water outlet end 1322. The utility model also comprises a pressing switch rod 1323 and a seal 1324 which is connected with the pressing switch rod 1323 along the axial direction. When the second waterway control valve core 132 is opened, the pressing switch rod 1323 moves upward along the axis, so that the seal 1324 is separated from the outer wall of the third water outlet end 1322 and connected with the second water inlet end 1321. When the second waterway control valve core 132 is closed, the pressing switch rod 1323 moves downward along the axis, so that the seal 1324 and the outer wall of the third water outlet end 1322 are sealed, and the second water outlet end 1313 and the second water inlet end 1321 are separated.

Embodiment 2

Figure 7:
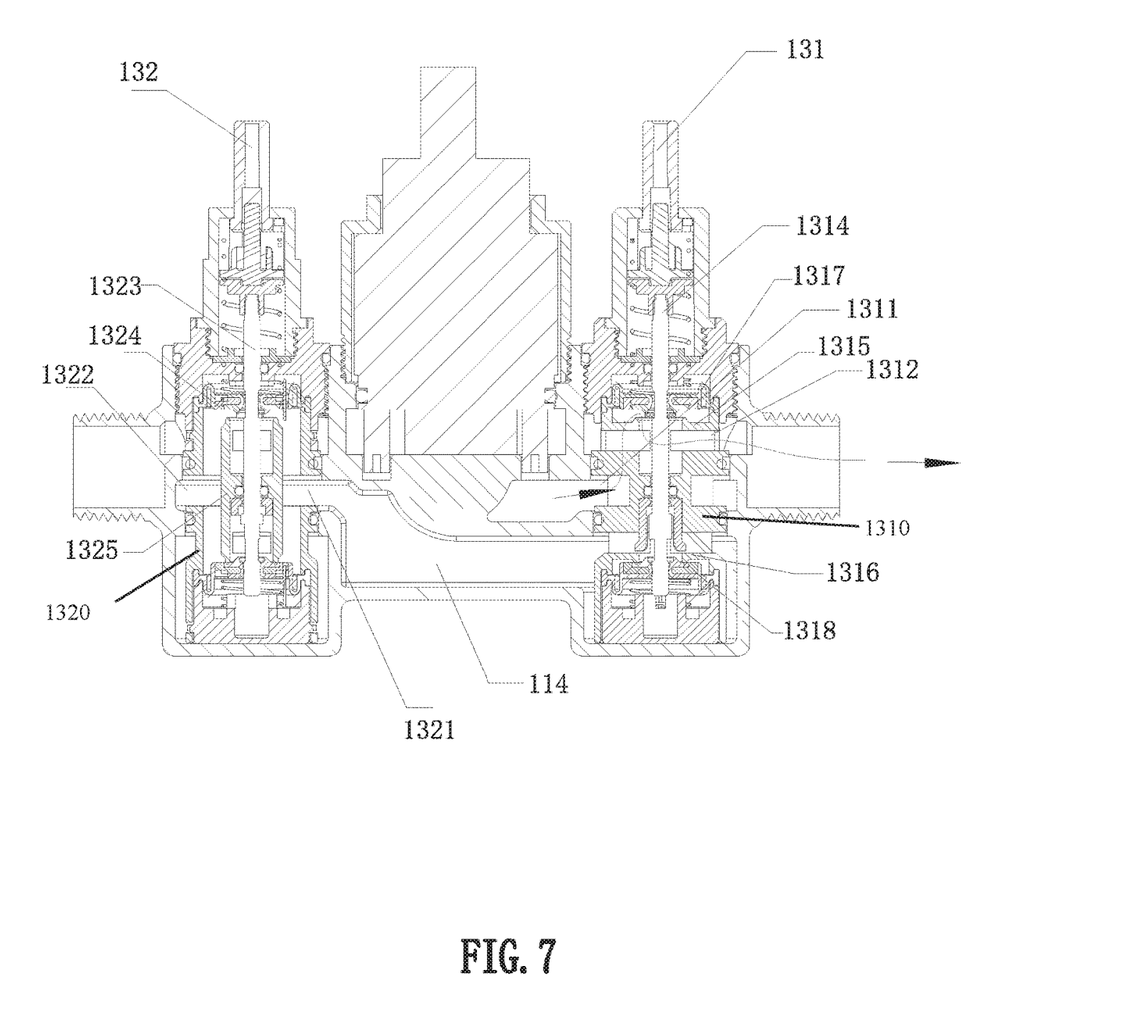
FIG. 7 is a waterway map when the first water outlet discharge water in the preferred embodiment 2 of the invention.
Figure 8:
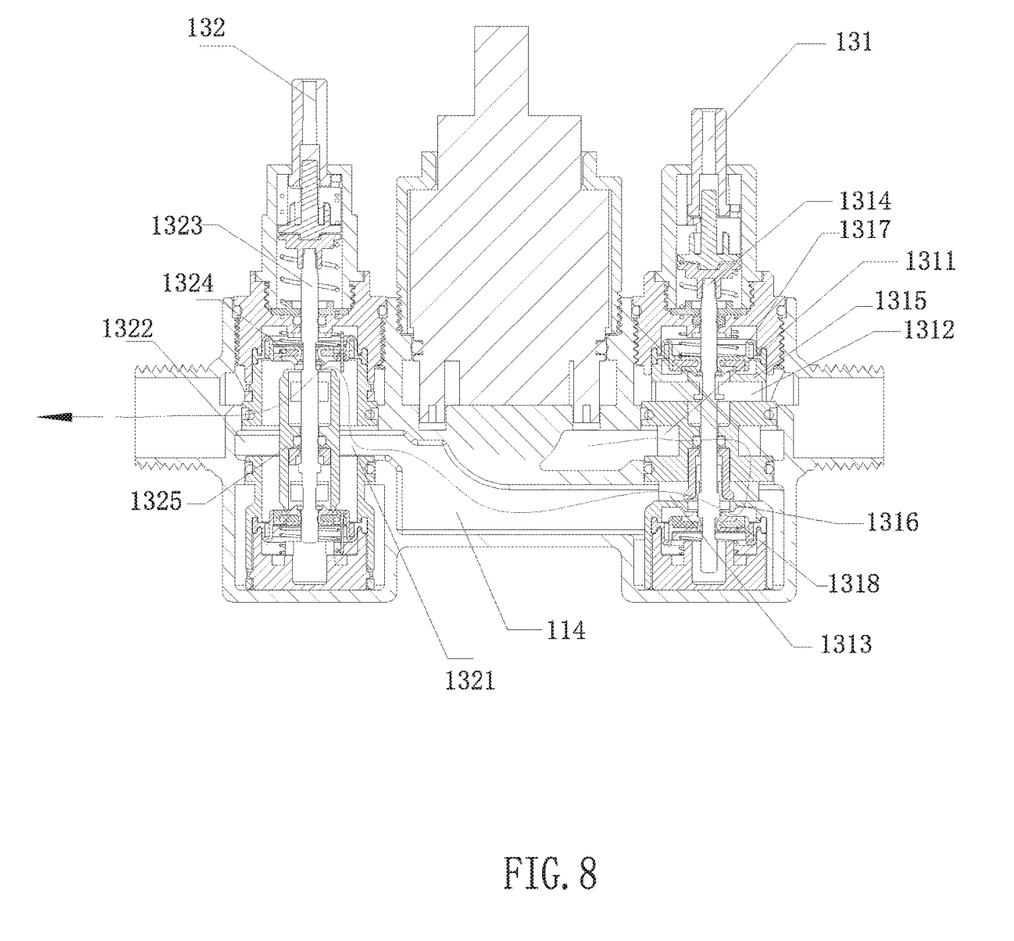
FIG. 8 is a waterway map when the second water outlet discharge water in the preferred embodiment 2 of the invention.
Figure 9:
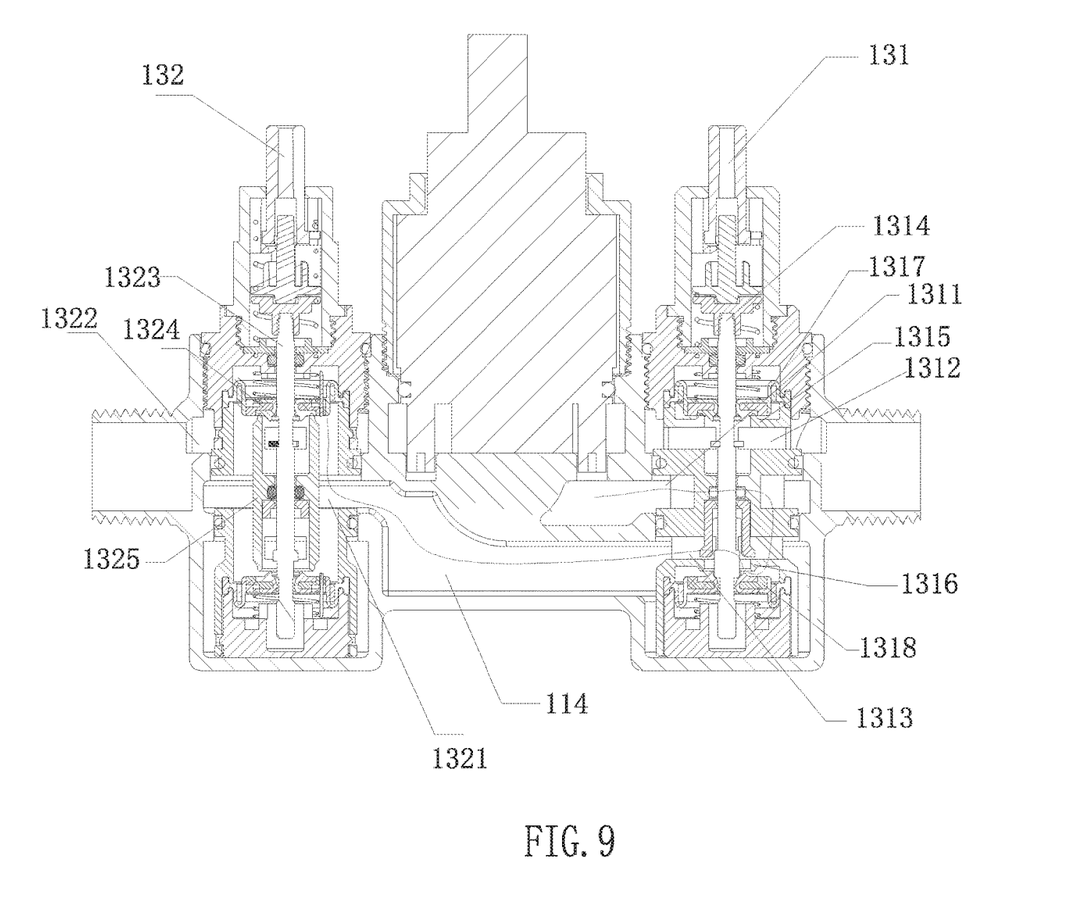
FIG. 9 is a waterway map showing that the first water outlet and the second water outlet do not discharge water in the preferred embodiment 2 of the invention.

Referring to FIG. 7-9, the difference between the embodiment and the embodiment 1 is that: The first waterway control valve core 131 includes a shell. The side wall of the shell is provided with the first water outlet end 1312 and the second water outlet end 1313 along the axis, and the first water inlet end 1311 is located between the first water outlet end 1312 and the second water outlet end 1313.

Included also are a pressing switch rod 1314, a first seal 1315 and a second seal 1316 arranged in the shell along the axis, the first seal 1315 is between the first water inlet end 1311 and the first water outlet end 1312, and the second seal 1316 is between the first water inlet end 1311 and the second water outlet end 1313. A first blocking element 1317 and a second blocking element 1318 connected along the axis are arranged outside the pressing switch rod 1314, and the first blocking element 1317 and the second blocking element 1318 are arranged up and down along the axis. When the first waterway control valve core 131 is opened, the pressing switch rod moves downward along the axis, the first blocking element 1317 is separated from the first seal 1315, and the second blocking element 1318 is sealed against the second seal 1316. When the first waterway control valve core 131 is closed, the pressing switch rod 1314 moves upward along the axis, the second blocking element 1318 is separated from the second seal 1316, and the first blocking element 1317 is sealed against the first seal 1315.

The second waterway control valve core 132 comprises a shell; the side wall of the shell is provided with the second water inlet end 1321 and the third water outlet end 1322. The second water inlet end 1321 is connected with the second waterway 114. A pressing switch rod 1323 and a seal 1324 arranged in the shell along the axial direction are also included. The seal 1324 is positioned between the second water inlet end 1321 and the third water outlet end 1322. The pressing switch rod 1323 is provided with a blocking element 1325 which is connected with it along the axial direction. When the second waterway control valve core 132 is opened, the pressing switch rod 1323 moves upward along the axis, so that the blocking element 1325 is separated from the seal 1324, and the third water outlet end 1322 and the second water inlet end 1321 are connected. When the second waterway control valve core 132 is closed, the pressing switch rod 1323 moves downward along the axis, so that the blocking element 1325 is fitted with the seal 1324, and the third water outlet end 1322 and the second water inlet end 1321 are separated.

As mentioned above, only the better concrete implementation of the present invention is provided, but the design concept of the present invention is not limited thereto. Any technical personnel familiar with the technical field who uses this concept to make substantive changes to the present invention within the technical scope disclosed by the present invention belongs to the act of infringing upon the scope of protection of the present invention.

The invention claimed is:

1. A waterway switching valve, comprising:
   a valve body,
   a main control valve core, and
   two waterway control valve cores, wherein:
      the valve body comprises a water inlet channel, a first water outlet, and a second water outlet,
      the two waterway control valve cores corresponds to the first water outlet and the second water outlet one to one,
      the two waterway control valve cores define a first waterway control valve core and a second waterway control valve core,
      the first waterway control valve core and the second waterway control valve core are respectively disposed in the valve body,
      the valve body comprises a first waterway disposed between the water inlet channel and the first waterway control valve core and a second waterway disposed between the first waterway control valve core and the second waterway control valve core,
      when the first waterway control valve core is opened:
         the first waterway control valve core enables the first waterway to be in communication with the first water outlet,
      when the first waterway control valve core is closed:
         the first waterway control valve core enables the first waterway to be in communication with the second waterway, and
      when the second waterway control valve core is opened:
         the second waterway control valve core enables the second waterway to be in communication with the second water outlet.

2. The waterway switching valve according to claim 1, wherein:
   the water inlet channel comprises a cold water inlet, a hot water inlet, and a mixed water outlet, and
   the main control valve core is configured to open the mixed water outlet.

3. The waterway switching valve according to claim 1, wherein:
   the first waterway control valve core comprises a first water inlet end always in communication with the first waterway, a first water outlet end, and a second water outlet end,
   when the first waterway control valve core is opened:
      the first water outlet end is in communication with the first water outlet, and
   when the first waterway control valve core is closed:
      the second water outlet end is in communication with the second waterway.

4. The waterway switching valve according to claim 3, wherein:
   the second waterway control valve core comprises a second water inlet end and a third water outlet end,
   the second water inlet end is in communication with the second waterway,
   the third water outlet end is in communication with the second water outlet,
   when the second waterway control valve core is opened:
      the second water inlet end is in communication with the third water outlet end, and
   when the second waterway control valve core is closed,
      the second water inlet end is not in communication with the third water outlet end.

5. The waterway switching valve according to claim 4, wherein the first waterway control valve core and the second waterway control valve core are pressing control valve cores.

6. The waterway switching valve according to claim 5, comprising:
   a first pressing switch rod, and
   a first seal and a second seal axially disposed in a first shell, wherein:
      the first waterway control valve core comprises the first shell,
      a side wall of the first shell is disposed with the first water outlet end and the second water outlet end,
      the first water inlet end is disposed between the first water outlet end and the second water outlet end,
      the first seal is disposed between the first water inlet end and the first water outlet end,
      the second seal is disposed between the first water inlet end and the second water outlet end,
      an outer side of the first pressing switch rod is disposed with a blocking element configured to axially move with the first pressing switch rod,
      when the first waterway control valve core is opened:
         the first pressing switch rod axially moves downward to enable a first end of the blocking element to be separated from the first seal and a second end of the blocking element to hermetically abut the second seal, and
      when the first waterway control valve core is closed:
         the first pressing switch rod axially moves upward to enable the second end of the blocking element to be separated from the second seal and the first end of the blocking element to hermetically abut the first seal.

7. The waterway switching valve according to claim 5, comprising:
   a second pressing switch rod, and
   a third seal configured to axially move with the second pressing switch, wherein:
      the second waterway control valve core comprises a second shell, a side wall of the second shell is disposed with the second water inlet end, a bottom end portion of the second shell is disposed with the third water outlet end, when the second waterway control valve core is opened:

the second pressing switch rod axially moves upward to enable the third seal to be separated from a peripheral wall of the third water outlet end, and the second water outlet end is in communication with the second water inlet end, and when the second waterway control valve core is closed:

the second pressing switch rod axially moves downward to enable the third seal to hermetically abut the peripheral wall of the third water outlet end, and the second water outlet end is not in communication with the second water inlet end.

8. The waterway switching valve according to claim 5, comprising:

a first pressing switch rod, and a first seal and a second seal axially disposed in a first shell, wherein:

the first waterway control valve core comprises the first shell, a side wall of the first shell is disposed with the first water outlet end and the second water outlet end, the first water inlet end is disposed between the first water outlet end and the second water outlet end, the first seal is disposed between the first water inlet end and the first water outlet end, the second seal is disposed between the first water inlet end and the second water outlet end, an outer side of the first pressing switch rod is disposed with a first blocking element and a second blocking element configured to axially move with the first pressing switch rod, the first blocking element and the second blocking element are axially disposed along an up and down direction, when the first waterway control valve core is opened:

the first pressing switch rod axially moves downward to enable the first blocking element to be separated from the first seal and the second blocking element to hermetically abut the second seal, and when the first waterway control valve core is closed:

the first pressing switch rod axially moves upward to enable the second blocking element to be separated from the second seal and the first blocking element to hermetically abut the first seal.

9. The waterway switching valve according to claim 5, comprising:

a second pressing switch rod, and a third seal axially disposed in a second shell, wherein:

the second waterway control valve core comprises the second shell, a side wall of the second shell is disposed with the second water inlet end and the third water outlet end, the third seal is disposed between the second water inlet end and the third water outlet end;

the second pressing switch rod is axially disposed with a blocking element configured to move with the second pressing switch rod, when the second waterway control valve core is opened:

the second pressing switch rod axially moves upward to enable the blocking element to be separated from the third seal, and the third water outlet end is in communication with the second water inlet end, and when the second waterway control valve core is closed:

the second pressing switch rod axially moves downward to enable the blocking element to abut the third seal, and the third water outlet end is not in communication with the second water inlet end.

10. A waterway switching valve for a bathtub, comprising:

the waterway switching valve according to claim 1, wherein:

the first water outlet is connected to a bathtub faucet, and the second water outlet is connected to a shower head.

11. The waterway switching valve for the bathtub according to claim 10, comprising:

an operation panel, wherein:

an operation handle of the main control valve core and operation parts of the two waterway control valve cores are disposed in the operation panel.

12. A switching method for the waterway switching valve according to claim 1, comprising:

1) opening the main control valve core;

2) opening the first waterway control valve core, wherein while the first waterway control valve core is opened the first water outlet discharges water and the second water outlet does not discharge the water no matter whether the second waterway control valve core is opened or closed, and 3) closing the first waterway control valve core and opening the second waterway control valve core to discharge the water through the second water outlet.

* * * * *